United States Patent [19]
Nakazato et al.

[11] Patent Number: 5,930,551
[45] Date of Patent: Jul. 27, 1999

[54] PRINTING SYSTEM ALLEVIATING TIMING PROBLEMS DUE TO WARM-UP AND PAPER OUTAGE

[75] Inventors: Hirohiko Nakazato; Yukihiro Saida, both of Tokyo, Japan

[73] Assignee: Oki Data Corporation, Tokyo, Japan

[21] Appl. No.: 08/927,029

[22] Filed: Sep. 10, 1997

[30] Foreign Application Priority Data

Sep. 30, 1996 [JP] Japan .................................. 8-258958

[51] Int. Cl.⁶ .................................................. G03G 15/20
[52] U.S. Cl. .............................. 399/1; 399/335; 399/24; 399/82; 399/337; 347/212
[58] Field of Search .................... 399/1, 75–77, 399/81, 320, 361, 335–338, 24, 82; 347/224–226, 900, 211, 212, 247; 364/557

[56] References Cited

U.S. PATENT DOCUMENTS

| | | |
|---|---|---|
| 5,274,461 | 12/1993 | Mitsuhashi .............................. 358/296 |
| 5,489,935 | 2/1996 | Dornier . |
| 5,565,972 | 10/1996 | Honda et al. . |
| 5,579,092 | 11/1996 | Isobe et al. . |

*Primary Examiner*—Richard Moses
*Attorney, Agent, or Firm*—Panitch Schwarze Jacobs & Nadel, P.C.

[57] ABSTRACT

According to a first aspect of the invention, when a printer runs out of printing media while printing data supplied by a host computer on a series of pages, after being resupplied with printing media, the printer waits for the host computer to resume the sending of data before printing is resumed. According to a second aspect of the invention, before starting to prepare the data for the first page, the host computer sends the printer a warm-up command, causing the printer to commence preparations for printing.

27 Claims, 17 Drawing Sheets

1C 14h 't'   : FUSING TEMPERATURE COMMAND
  <x>          : TEMPERATURE CODE x=0    →    100°C
                      x=1    →    110°C
                      x=2    →    120°C
                      x=3    →    130°C

<p>          : END OF COMMAND
```

PRINTING SYSTEM ALLEVIATING TIMING PROBLEMS DUE TO WARM-UP AND PAPER OUTAGE

BACKGROUND OF THE INVENTION

The present invention relates to methods and apparatus for solving timing problems that occur in certain types of printing systems.

One type of printing system to which the present invention pertains comprises an electrophotographic printer, of the type sometimes referred to as a 'dumb printer,' coupled to a host computer. The printer relies on the host computer to send bit-mapped dot data. The dot data are created by software running on the host computer, and sent through a printer port by a program referred to as a port driver. The electrophotographic printer stores the data in a buffer memory, and prints the data one dot line at a time, in the order received.

One timing problem arises when the printer runs out of paper (or other printing media) during the printing of a series of pages. As soon as this condition is detected, the printer sends the host computer a control signal instructing the host computer to stop sending data, but in the meantime, part of the data for the next page has already been sent and stored in the printer's buffer memory. After being resupplied with paper, the printer begins printing the data stored in the buffer memory, and sends the host computer another control signal, requesting further data.

The problem is that during the time while the paper supply is being replenished and no data are being sent to the printer, the host computer's operating system may de-activate the port driver, and may re-activate the port driver to check the printer's status only at relatively long intervals thereafter. There may accordingly be a significant delay before the host computer recognizes that the printer is printing the next page and needs more data. If this delay is too long, the printer will run out of data to print, and be forced to deliver an incompletely printed page.

Another timing problem concerns the printer's warm-up time. It takes several seconds for the heating roller of an electrophotographic printer reach the temperature necessary for printing. To conserve energy, a conventional electrophotographic printer does not warm up its heating roller until the arrival of data to be printed. In a conventional printing system, when a series of pages are printed, the host computer prepares the data for the first page, then starts sending data to the printer. Before printing can begin, a double delay is therefore incurred: the printer's warm-up delay is added to the delay that occurs while the host computer is preparing the first page of data.

SUMMARY OF THE INVENTION

It is accordingly an object of the present invention to prevent the printing of incomplete pages when a printer runs out of printing media during the printing of a series of pages.

Another object of the invention is to shorten the delay before the start of printing.

According to a first aspect of the invention, in a printer of the type that stores data received from a host computer in a buffer memory, when the printer runs out of printing media, the printer signals the host computer to stop sending data, and sets an internal flag. When resupplied with printing media, the printer signals the host computer to resume sending data. The printer clears the flag when more data to begin arriving from the host computer. After clearing the flag, the printer resumes the printing of data stored in the buffer memory.

According to a variation of the first aspect of the invention, the printer can be directed to wait for the arrival of more data before resuming printing after being resupplied with printing media, or to wait for a designated time before resuming printing, or to resume printing without waiting.

According to a second aspect of the invention, when a printer driver in the host computer prepares for the printing of a series of pages, the printer driver sends a warm-up command to the printer before beginning to prepare data for the first page. The printer starts preparing to print as soon as the warm-up command is received, without waiting for other data to arrive. For an electrophotographic printer, preparing to print comprises heating a heating roller in the printer to a certain temperature.

According to a variation of the second aspect, the temperature to which the heating roller is heated can be set by the host computer.

BRIEF DESCRIPTION OF THE DRAWINGS

In the attached drawings:

FIG. 14 illustrates the format of a fusing temperature command employed in a fourth embodiment of the invention;

DETAILED DESCRIPTION OF THE INVENTION

Figure 1:
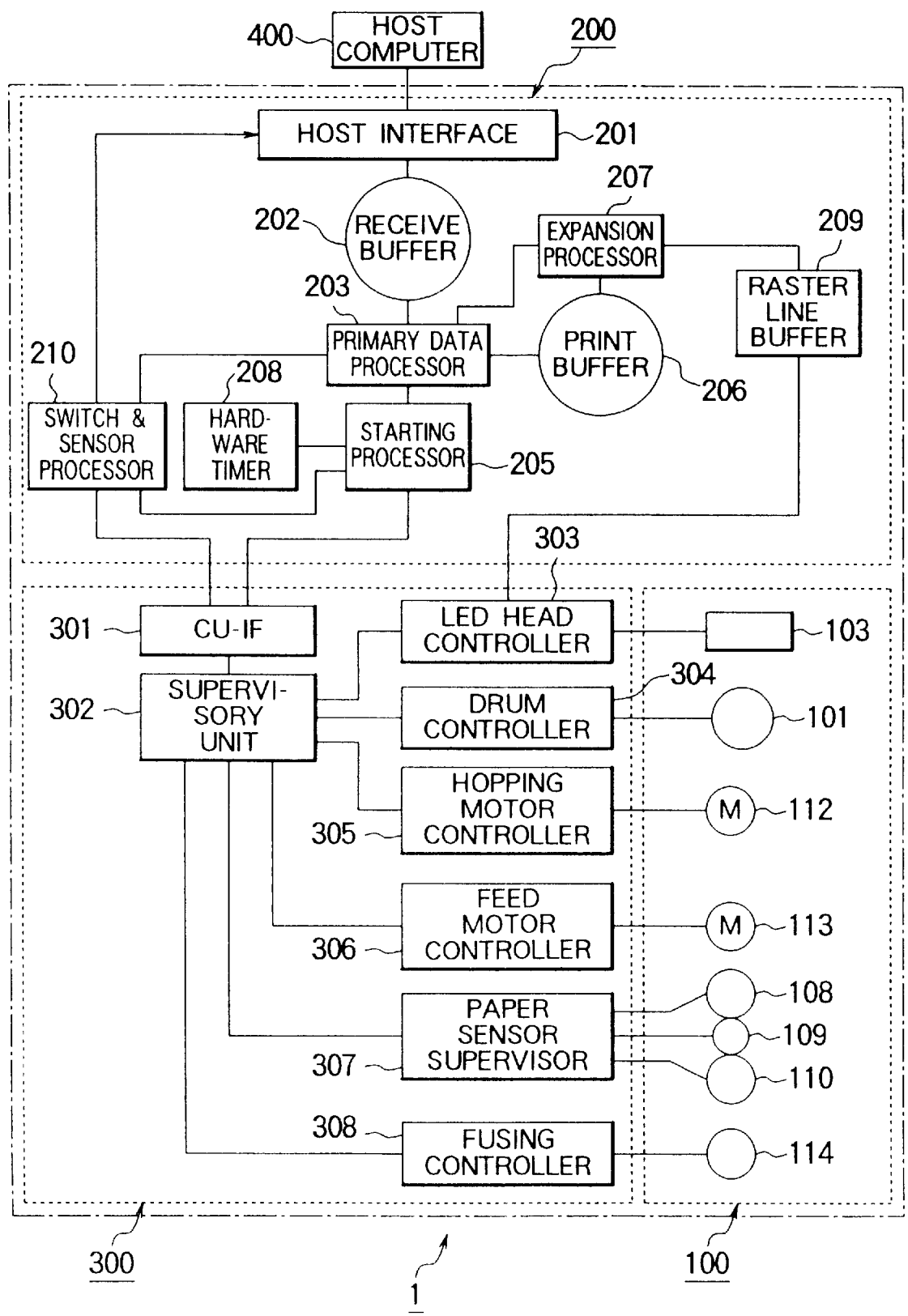
FIG. 1 is a block diagram illustrating the structure of an electrophotographic printer.

Embodiments of the invention will be described with reference to the attached illustrative drawings. Identical elements appearing in different drawings will be indicated by the same reference numerals.

Referring to FIG. 1, the first embodiment is an electrophotographic printer 1 comprising a printing engine 100, a data processing controller 200, and a printing engine controller 300. The data processing controller 200 receives print data from a host computer 400 and controls the printing engine controller 300, which in turn controls the printing engine 100. The host computer 400 is, for example, a personal computer or workstation.

Figure 2:
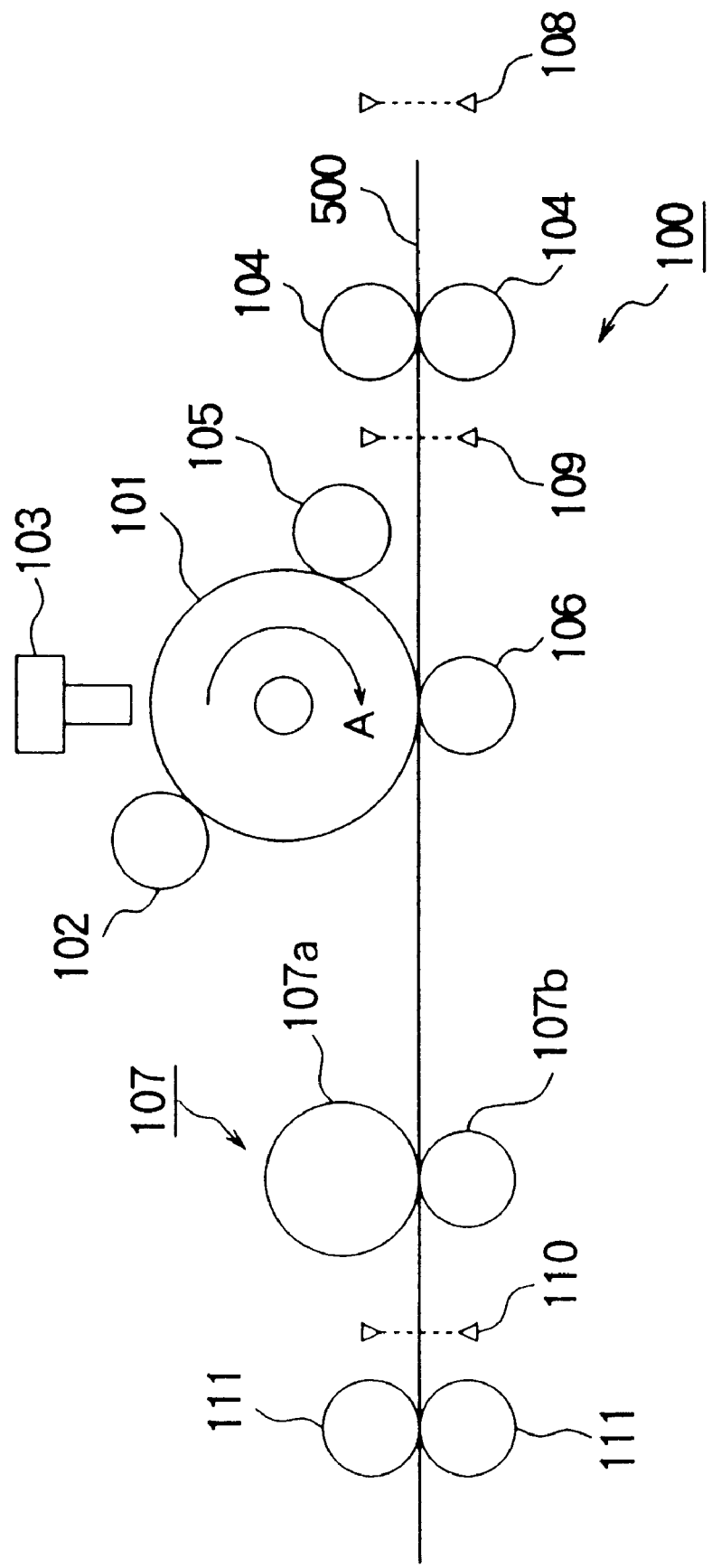
FIG. 2 illustrates the structure of the printing engine in FIG. 1.

Referring to FIG. 2, the printing engine 100 comprises a photosensitive drum 101, which turns in the direction of arrow A. During printing, the surface of the photosensitive drum 101 is electrically charged by a charging roller 102, then selectively exposed to light from a light-emitting-diode (LED) printing head 103, forming a latent electrostatic image. In the meantime, a sheet of paper 500 is extracted from a cassette or tray (not visible) and fed toward the photosensitive drum 101 by a pair of hopping rollers 104.

The image is developed by the application of toner particles from a developing roller 105, then transferred to the paper 500 by a transfer roller 106. The paper 500 is next fed into a fusing unit 107 comprising a heating roller 107a and pressure roller 107b, which fuse the toner particles onto the paper by a combination of heat and pressure. Toner particles not transferred to the paper 500 are removed by a cleaning mechanism (not visible) disposed between the transfer roller 106 and charging roller 102.

The presence or absence of paper 500 in the printer is detected by a paper-end sensor 108. During paper transport, the paper 500 is detected by a hopping sensor 109 disposed between the hopping rollers 104 and photosensitive drum 101, and by an exit sensor 110 disposed on the exit side of the fusing unit 107. These sensors 109 and 110 confirm the passage of each sheet of paper 500 through the printing engine 100. Printed pages are delivered to a tray (not visible) by a pair of eject rollers 111.

Referring again to FIG. 1, the printing engine 100 also comprises a hopping motor 112 that drives the hopping rollers 104, a paper feed motor 113 that drives the photosensitive drum 101, and a temperature sensor 114 that senses the temperature of the heating roller 107a.

The printing engine controller 300 comprises a control-unit interface (CU-I/F) 301, a supervisory unit 302, a LED head controller 303, a drum controller 304, a hopping motor controller 305, a feed motor controller 306, a paper sensor supervisor 307, and a fusing controller 308. The control-unit interface 301 communicates with the data processing controller 200 by sending and receiving control signals. The supervisory unit 302 monitors the status of the control units in the printing engine controller 300. The LED head controller 303 receives dot data, one raster line at a time, from the data processing controller 200, and controls the LED printing head 103. The drum controller 304 controls the charging, developing, transfer, discharging, and cleaning operations associated with the photosensitive drum 101. The hopping motor controller 305 controls the hopping motor 112. The feed motor controller 306 controls the paper feed motor 113. The paper sensor supervisor 307 receives and processes signals from the paper-end sensor 108, hopping sensor 109, and exit sensor 110. The fusing controller 308 receives temperature signals from the temperature sensor 114 and controls the feeding of current to a heating element in the heating roller 107a (not shown).

The data processing controller 200 comprises a host interface 201, a receive buffer 202, a primary data processor 203, a starting processor 205, a print buffer 206, an expansion processor 207, a hardware timer 208, a raster line buffer 209, and a switch and sensor processor 210. The buffers 202, 206, and 209 comprise random-access memory devices or portions thereof. The hardware timer 208 is a hardware timing and counting device. The processors and interface 201, 203, 205, 207, and 210 comprise a combination of memory hardware, processor hardware, and software; that is, each comprises a program stored in a non-volatile memory, which executes on a processor device, using random-access memory for reading and writing flag information and other data.

The host interface 201 receives print data from the host computer 400, and temporarily stores the print data in the receive buffer 202. The host interface 201 also sends signals to the host computer 400 to control the data flow.

The primary data processor 203 analyzes the data in the receive buffer 202, determines the beginning and end of each page, notifies the starting processor 205 and expansion processor 207 of the start of each page, and stores the data to be printed in the print buffer 206.

When notified of the start of a new page, the starting processor 205 signals the expansion processor 207 and printing engine controller 300 to start the printing process. The starting processor 205 also controls the hardware timer 208, by setting and clearing a timer run flag. The hardware timer 208 is an up-counter that increments once per microsecond.

The initial data stored in the print buffer 206 for each page comprise a page header specifying the page size and dot density. These initial data are followed by the dot data, which are compressively encoded. When activated by the primary data processor 203, the expansion processor 207 reads the page header, then decodes the dot data, one raster line at a time, and stores the decoded dot data in the raster line buffer 209. The dot data in the raster line buffer 209 are read by the LED head controller 303. The raster line buffer 209 has enough capacity to store one or more raster lines of dot data, but need not be capable of storing an entire page of dot data.

The switch and sensor processor 210 receives a paper-end signal from the printing engine controller 300, and sets and clears corresponding flags. These flags are read by the host interface 201, primary data processor 203, and starting processor 205. Other functions of the switch and sensor processor 210 will not be described, as they are not relevant to the present invention.

Figure 3:
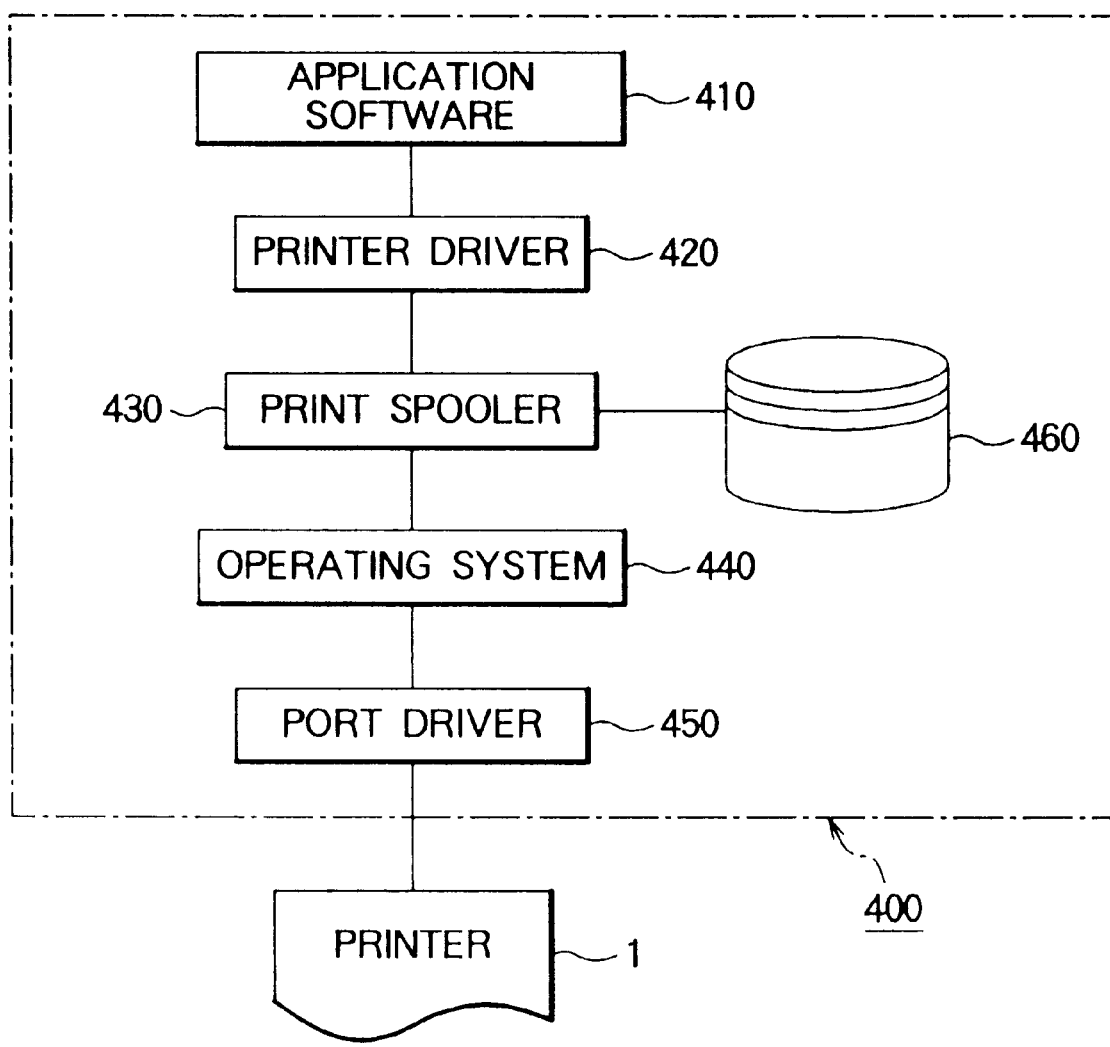
FIG. 3 illustrates the structure of the host computer that sends print data to the printer in FIG. 1.

FIG. 3 shows the relevant parts of the host computer 400, which comprise application software 410, a printer driver 420, a print spooler 430, an operating system 440, a port driver 450, and a file memory 460. The file memory 460 is a hardware device such as a rotating magnetic disk; the other elements shown in FIG. 3 are software elements.

The application software 410 comprises programs such as word-processing and image-processing programs that generate source data to be printed. The source data may comprise, for example, a series of character codes, or commands in a page description language. The printer driver 420 converts the source data to the format required by the printer 1, and sends the converted data as print data to the print spooler 430. The print spooler 430 temporarily stores the print data in the file memory 460, then transfers the print data from the file memory 460 through the operating system 440 and port driver 450 to the printer 1.

Besides sending data to the printer 1, the port driver 450 receives status signals such as busy and ready signals from the printer 1, and notifies the print spooler 430 of the printer's status. During the printing of a series of pages, when the printer 1 becomes ready to receive data, the port driver 450 requests highest execution priority from the operating system 440. If the printer becomes temporarily disabled, by a paper-end condition, for example, the port driver 450 relinquishes its execution priority, places a request with the operating system 440 for re-activation after a certain time T, and enters an inactive state. The time T is typically a certain number of seconds.

When the port driver 450 relinquishes execution priority, the operating system 440 transfers this priority to an application program, arranging for the port driver 450 to be re-activated T seconds later. The actual time until the port driver 450 is re-activated may differ from T seconds, depending on the behavior of the application program. When re-activated, the port driver 450 checks the status of the printer 1, resumes sending data to the printer 1 if the printer 1 is ready, and re-enters the inactive state if the printer 1 is not ready.

Figure 4A:
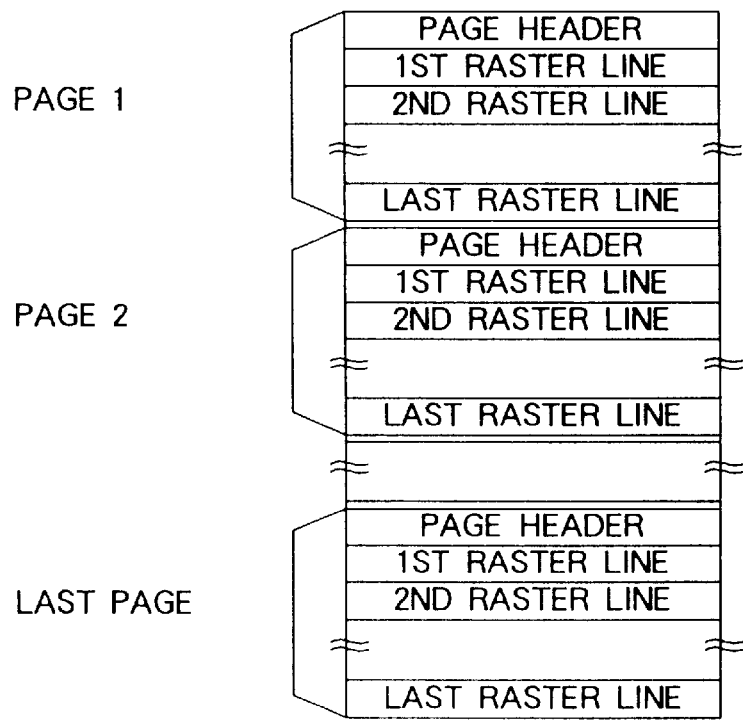
FIG. 4A illustrates the format of data sent to the printer in FIG. 1 for printing a series of pages.
Figure 4B:
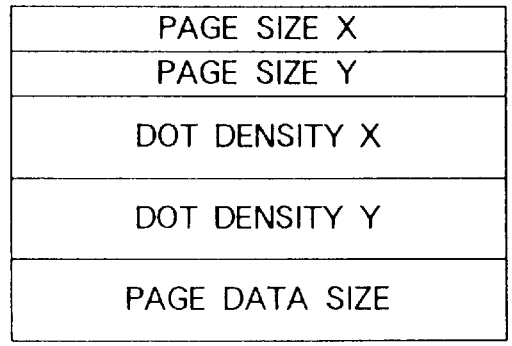
FIG. 4B illustrates the format of the page headers in a first embodiment of the invention.

FIG. 4A illustrates the format in which the electrophotographic printer 1 receives print data from the host computer 400, showing print data for a series of pages. The data for each page begin with a page header, followed by the compressed dot data for each raster line on the page. As shown in FIG. 4B, the page header includes the following information: the page size or width in the X-direction, parallel to the raster lines; the page size or length in the Y-direction, perpendicular to the raster lines; the dot density in the X-direction, expressed, for example, in dots per inch; the dot density in the Y-direction, expressed, for example, in raster lines per inch; and the data size of the compressed dot data for the entire page, expressed, for example, in bytes.

Figure 4C:
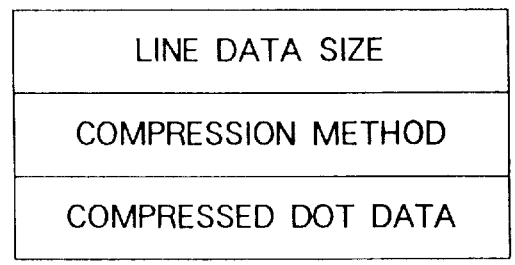
FIG. 4C illustrates the format of the raster line data in FIG. 4A.

FIG. 4C shows the format of the dot data for one raster line. The first item of information gives the compressed size of the data for the raster line. The next item specifies the coding method by which the dot data have been compressed. This is followed by the compressed dot data themselves.

Next, the operation of the first embodiment will be described by describing the operation of the components of the data processing controller 200, and attendant operations of the printing engine controller 300.

Figure 5:
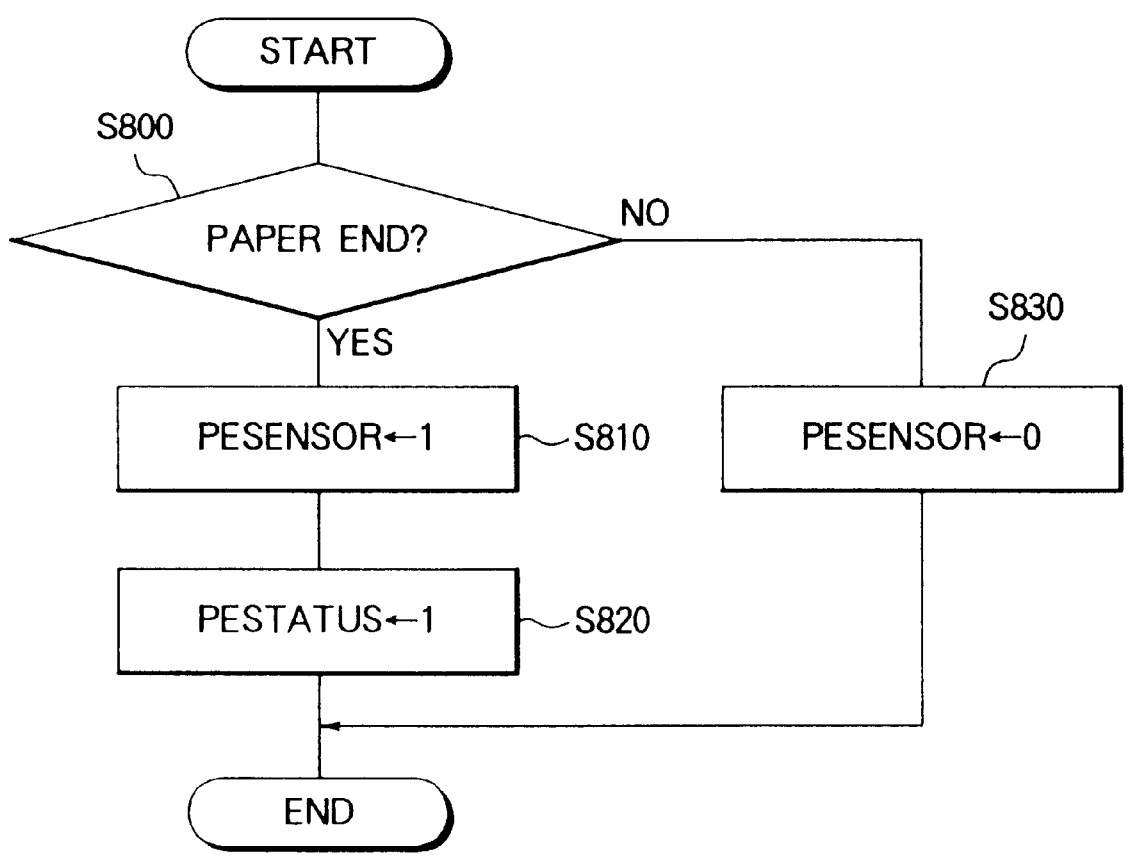
FIG. 5 is a flowchart illustrating the operation of the switch and sensor processor in FIG. 1.

FIG. 5 illustrates the operations of the switch and sensor processor 210 related to the paper-end sensor 108, which senses whether the printer 1 is out of paper. The signal generated by the paper-end sensor 108 is supplied to the paper sensor supervisor 307 in the printing engine controller 30, monitored by the supervisory unit 302, and passed through the control-unit interface 301 to the data processing controller 200.

The switch and sensor processor 210 checks the paper-end status as reported by the supervisory unit 302 (step S800). If the printer 1 is out of paper, the switch and sensor processor 210 sets a paper-end sensor flag (PESENSOR) to one (step S810), sets a paper-end status flag (PESTATUS) to one (step S820), then terminates operation. If the printer 1 is not out of paper, the switch and sensor processor 210 clears the paper-end sensor flag (PESENSOR) to zero (step S830), then terminates operation.

The operation shown in FIG. 5 can be initiated by, for example, an interrupt signal generated by the supervisory unit 302 at each transition of the paper-end status signal output by the paper sensor supervisor 307. Alternatively, the switch and sensor processor 210 can be initiated from within the data processing controller 200 whenever it becomes necessary to check the paper-end status.

Figure 6:
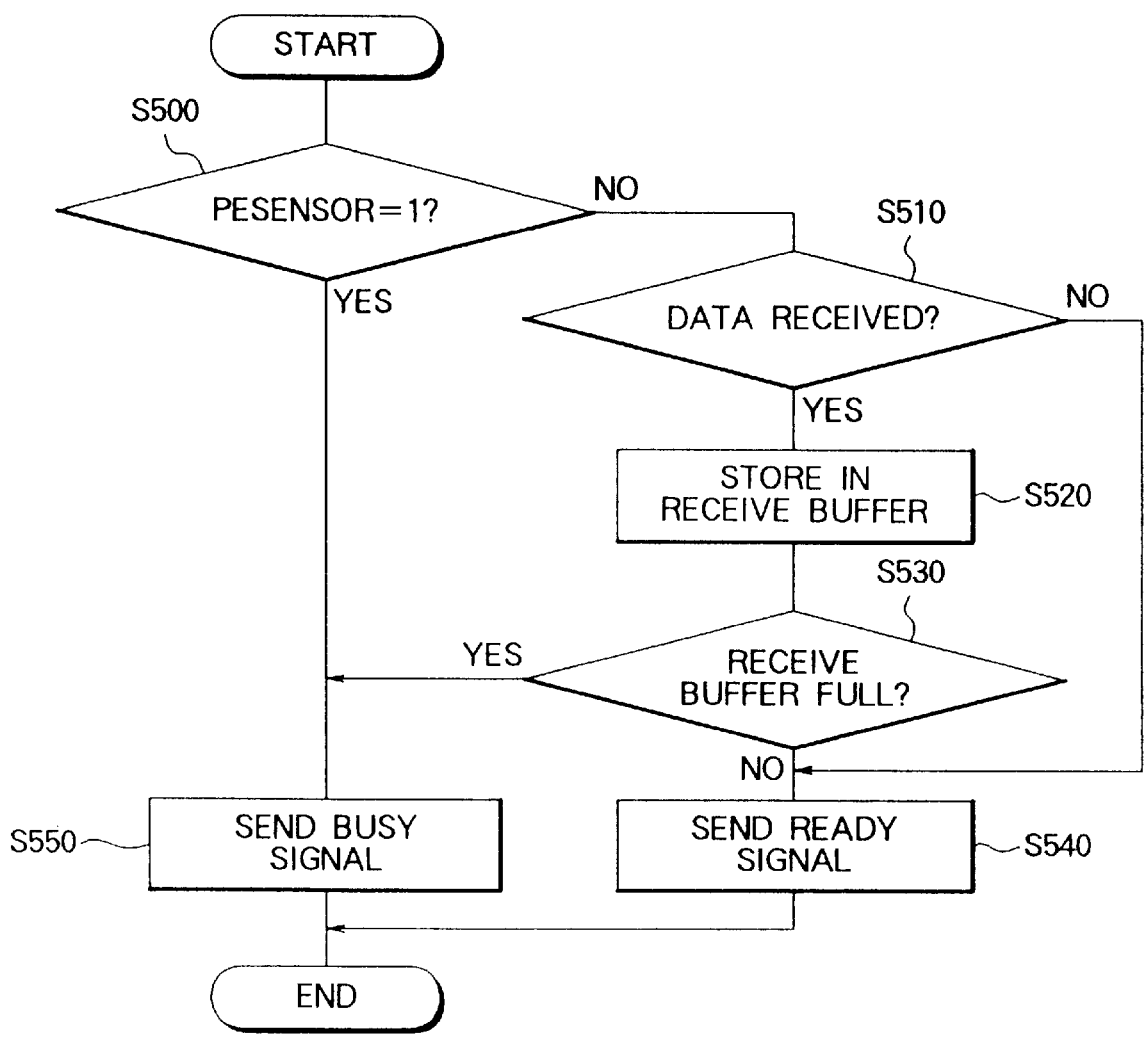
FIG. 6 is a flowchart illustrating the operation of the host interface in FIG. 1.

FIG. 6 illustrates the basic operation of the host interface 201 in receiving data from the host computer 400, omitting details not relevant to the present invention. First, the host interface 201 checks the switch and sensor processor's paper-end sensor flag (PESENSOR) (step S500). If this flag is cleared to zero, indicating that the printer 1 is not out of paper, the host interface 201 determines whether any new data have been received from the host computer 400 (step S510). If data have been received, the host interface 201 stores the data in the receive buffer 202 (step S520), then determines whether the receive buffer 202 is full, or whether the receive buffer 202 has enough free space remaining to receive more data (step S530). If sufficient free space remains available, the host interface 201 sends a ready signal to the host computer 400 (step S540). If the receive buffer 202 is full, or if the printer is out of paper, the host interface 201 sends a busy signal to the host computer 400 (step S550). Data are received by repetitions of this process.

The busy and ready signals are received by the port driver 450 in the host computer 400. If the busy signal persists for a certain time, the port driver 450 is de-activated, as described earlier.

Figure 7:
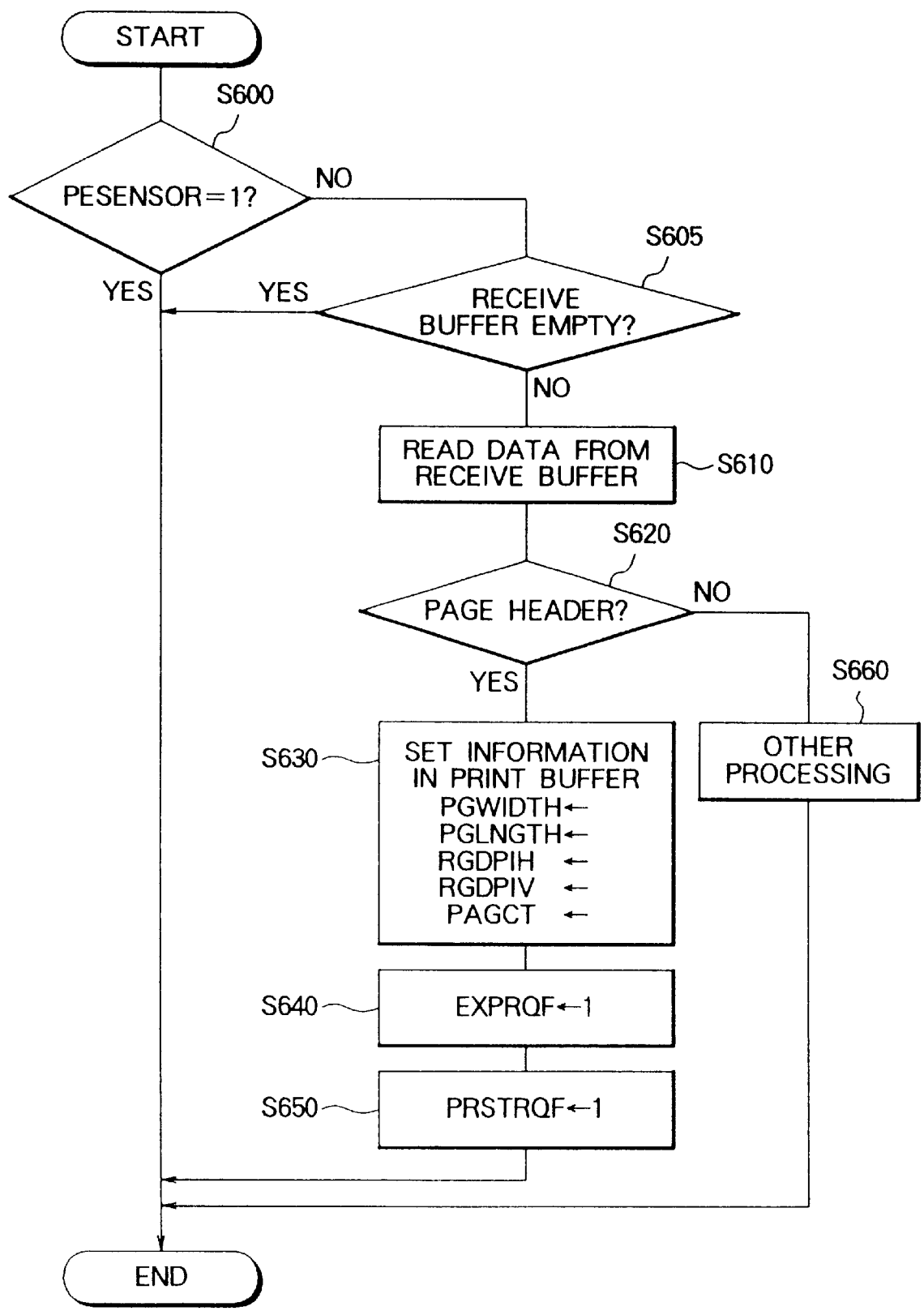
FIG. 7 is a flowchart illustrating the operation of the primary data processor in the first embodiment.

FIG. 7 illustrates the operation of the primary data processor 203. In processing data in the receive buffer 202, the primary data processor 203 begins by checking the switch and sensor processor's paper-end sensor flag (PESENSOR) (step S600). If this flag is cleared to zero, indicating that the printer 1 is not out of paper, the primary data processor 203 determines whether an amount of unprocessed data at least equal to the size of a page header remains in the receive buffer 202 (step S605). If not, the receive buffer is considered to be empty. If at least this amount of unprocessed data is present, the primary data processor 203 begins reading the data from the receive buffer 202 (step S610), and determines whether the data being read constitute a page header (step S620).

If the data constitute a page header, the primary data processor 203 extracts the information shown in FIG. 4B from the page header, and stores this information in predetermined locations in the print buffer 206 (step S630). These predetermined locations may have names such as PGWIDTH (page width), PGLENGTH (page length), RGDPIH (horizontal dots per inch), RGDPIV (vertical dots per inch), and PAGCT (page data count). After storing the header information, the primary data processor 203 sets an expansion request flag (EXPRQF) to one (step S640), and sets a print-start request flag (PRSTRQF) to one (step S650).

If the data read from the receive buffer 202 do not constitute a page header, the primary data processor 203 carries out other appropriate processing (step S660). If the data constitute compressed dot data, for example, the primary data processor 203 transfers the data to the print buffer 206, keeping count of the amount of data transferred and comparing this count with page data count (PGCT) in order to identify the end of the data for the page. If the data constitute a command, the primary data processor 203 executes the command.

If the printer is out of paper, or if the amount of unprocessed data in the receive buffer 202 is less than the page-header size, the primary data processor 203 does not read data from the receive buffer 202.

Figure 8:
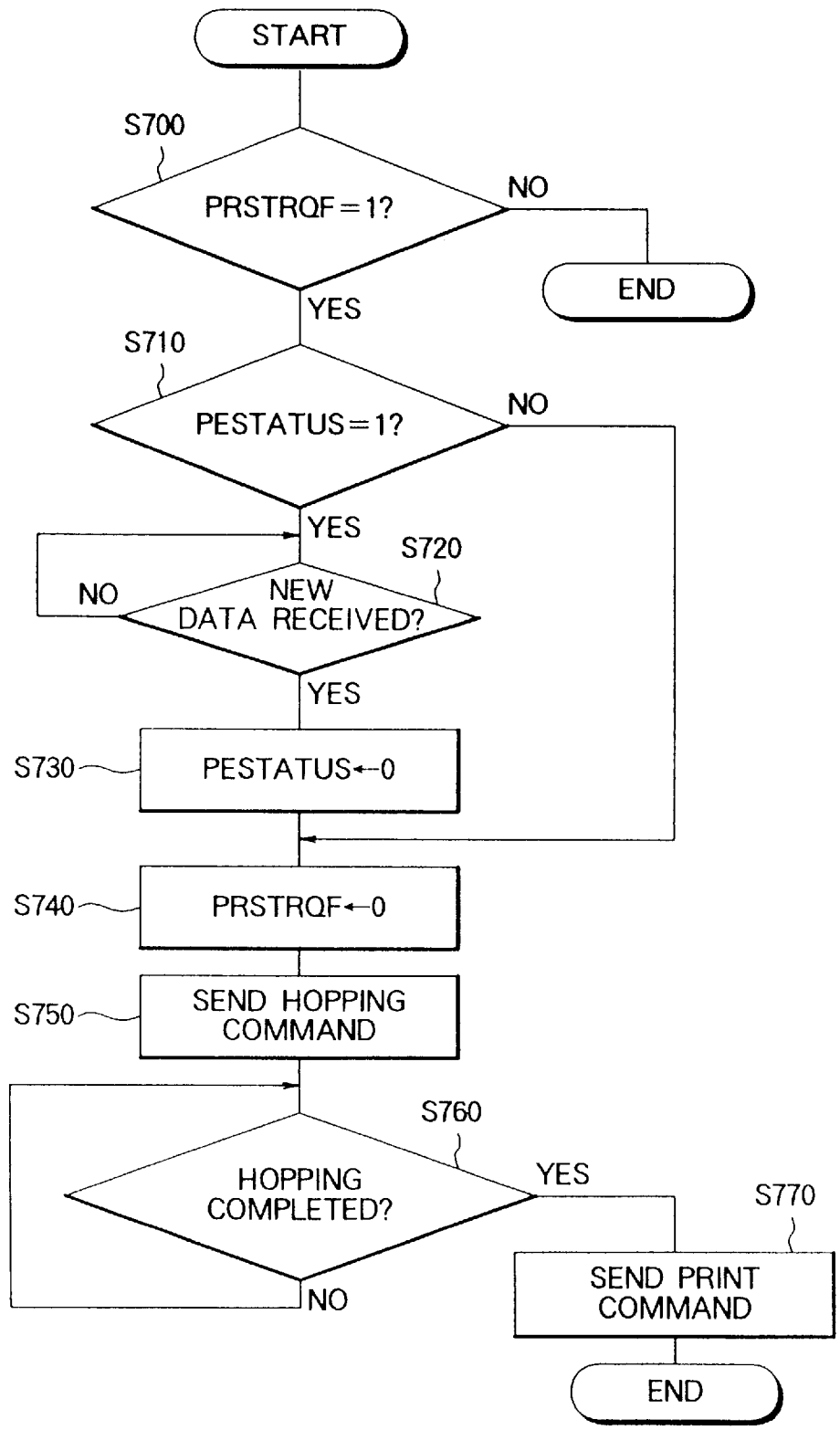
FIG. 8 is a flowchart illustrating the operation of the starting processor in the first embodiment.

FIG. 8 illustrates the operation of the starting processor 205. When activated, the starting processor 205 begins by checking the print-start request flag PRSTRQF (step S700) and paper-end status flag PESTATUS (step S710). If the print-start request flag is cleared to zero, the starting processor 205 immediately terminates operation.

If the print-start request flag is set to one but the paper-end status flag is also set to one, the starting processor 205 waits for the printer 1 to receive at least one more byte of new data from the host computer 400 (step S720). After at least one more byte has been received, the starting processor 205 clears the paper-end status flag to zero (step S730).

If the print-start request flag is set to one and the paper-end status flag is cleared to zero, the starting processor 205 skips steps S720 and S730.

Next, the starting processor 205 clears the print-start request flag to zero (step S740), sends a hopping command to the printing engine controller 300 (step S750), and waits for the hopping operation to be completed (step S760). In the hopping operation, the hopping motor controller 305 controls the hopping motor 112 so as to make the hopping rollers 104 feed a sheet of paper toward the photosensitive drum 101. Completion of the hopping operation is detected by the hopping sensor 1099 and reported to the starting processor 205 via the paper sensor supervisor 307, supervisory unit 3029 and control-unit interface 301.

When hopping is completed, the starting processor 205 sends a print command to the printing engine controller 300 (step S770). This command activates the feed motor controller 306 and re-activates the hopping motor controller 305, which control the paper feed motor 113 and hopping motor 112 so as to turn the photosensitive drum 101 and hopping rollers 104.

Following the operations in FIG. 8, the expansion processor 207 reads the expansion request flag (EXPRQF) set by the primary data processor 203, and begins expanding the compressed dot data stored in the print buffer 206 according to the header information stored in the print buffer 206, thereby creating the dot data that will actually be printed. These data are read from the raster line buffer 209 by the LED head controller 303, and a page is printed by the processes outlined earlier.

As shown in FIG. 5, if the printer 1 runs out of paper during the printing of a series of pages, the switch and sensor processor 210 sets the paper-end sensor flag (PESENSOR) and paper-end status flag (PESTATUS). As shown in FIGS. 6 and 7, reception of further data from the host computer 400 ceases until the paper-end sensor flag is cleared. The paper-end sensor flag is cleared by the switch and sensor processor 210 when the paper-end condition ends, but as shown in FIG. 8, the paper-end status flag remains set until the printer 1 subsequently begins receiving more data from the host computer 400. Only then does the starting processor 205 command the printing engine controller 300 to begin printing the next page.

Accordingly, if the port driver 450 is de-activated while the printer is out of paper, printing operations cannot resume until the port driver 450 is re-activated. Incomplete pages therefore cannot be printed because the printer 1 resumes printing before the host computer 400 recognizes the need to supply more print data. This solves one of the problems of the prior art.

Next, a second embodiment will be described. The second embodiment is an electrophotographic printer with the same overall configuration as the first embodiment, illustrated in FIG. 1, but differs in the format of the page header and in certain details of the operation of the primary data processor 203 and starting processor 205. The following description will be confined to these differences.

Figure 9A:
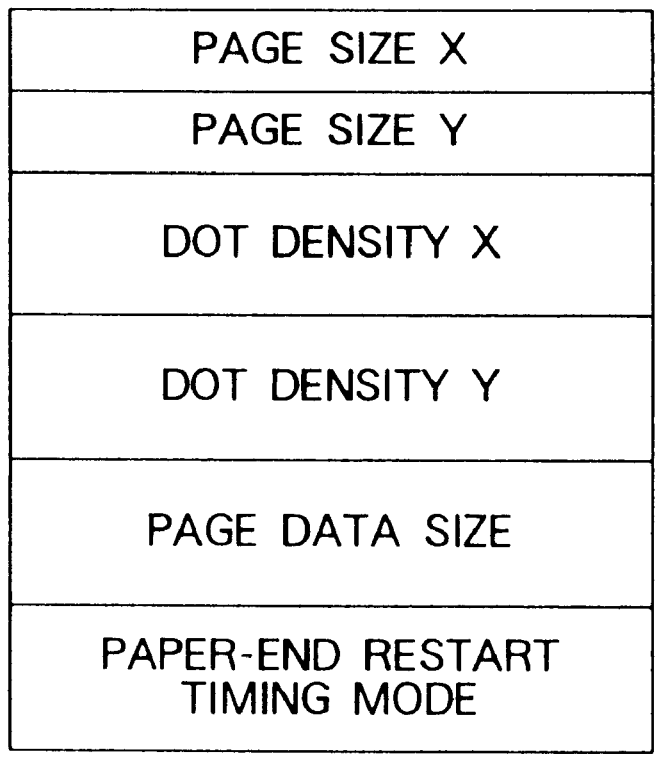
FIG. 9A illustrates the format of the page headers in a second embodiment of the invention.
Figure 9B:
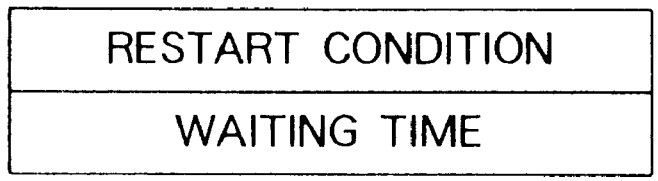
FIG. 9B illustrates the format of the paper-end restart timing mode item in FIG. 9A.

Referring to FIG. 9A, the page header in the second embodiment includes the same information as in the first embodiment, and an additional paper-end restart timing mode item following the page data size item. Referring to FIG. 9B, the paper-end restart timing mode item comprises a restart condition and waiting time.

The restart condition is a numerical value from zero to two. A value of zero designates an immediate restarting mode. A value of one designates the mode of the first embodiment, in which printing restarts after at least one more byte of print data is received from the host computer 400. A value of two indicates that printing should restart after a designated waiting time, regardless of when the host computer 400 resumes sending data. The waiting time is designated in microseconds, following the mode designation.

Figure 10:
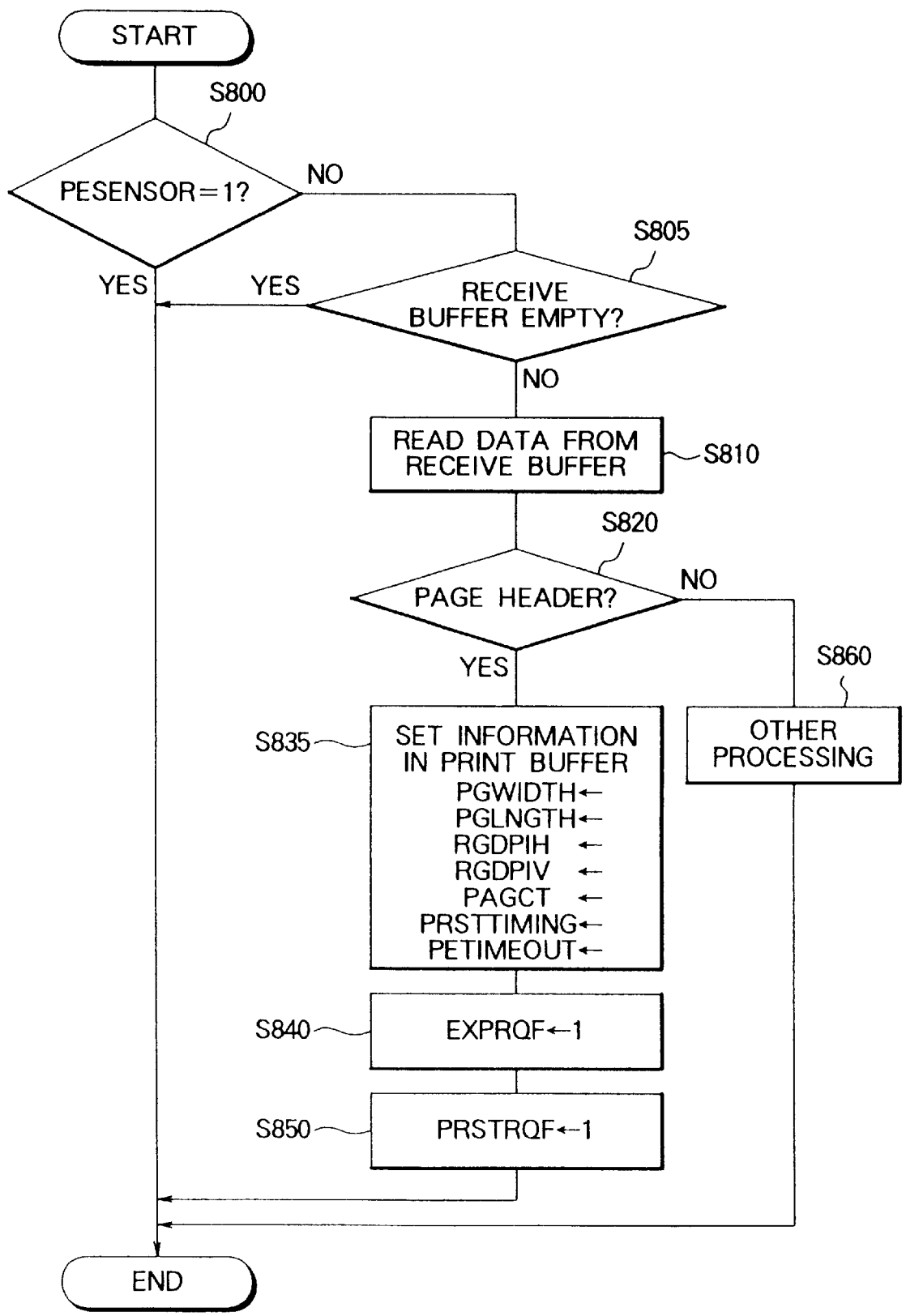
FIG. 10 is a flowchart illustrating the operation of the primary data processor in the second embodiment.

FIG. 10 illustrates the operation of the primary data processor 203 in the second embodiment. Steps S800, S805, S810, S820, S840, S850, and S860 are identical to the corresponding steps S600, S605, S610, S620, S640, S650, and S660 in the first embodiment, shown in FIG. 7. Step S835 comprises the setting of the same page size, dot density, and page data size information in the print buffer 206 as in the first embodiment, and the setting of two additional values: a print-start timing (PRSTTIMING) value, and a paper-end time-out (PETIMEOUT) value. The primary data processor 203 sets PRSTTIMING to zero, one, or two according to the restart condition designated in the page header, and sets PETIMEOUT to the waiting time designated in the page header.

Figure 11:
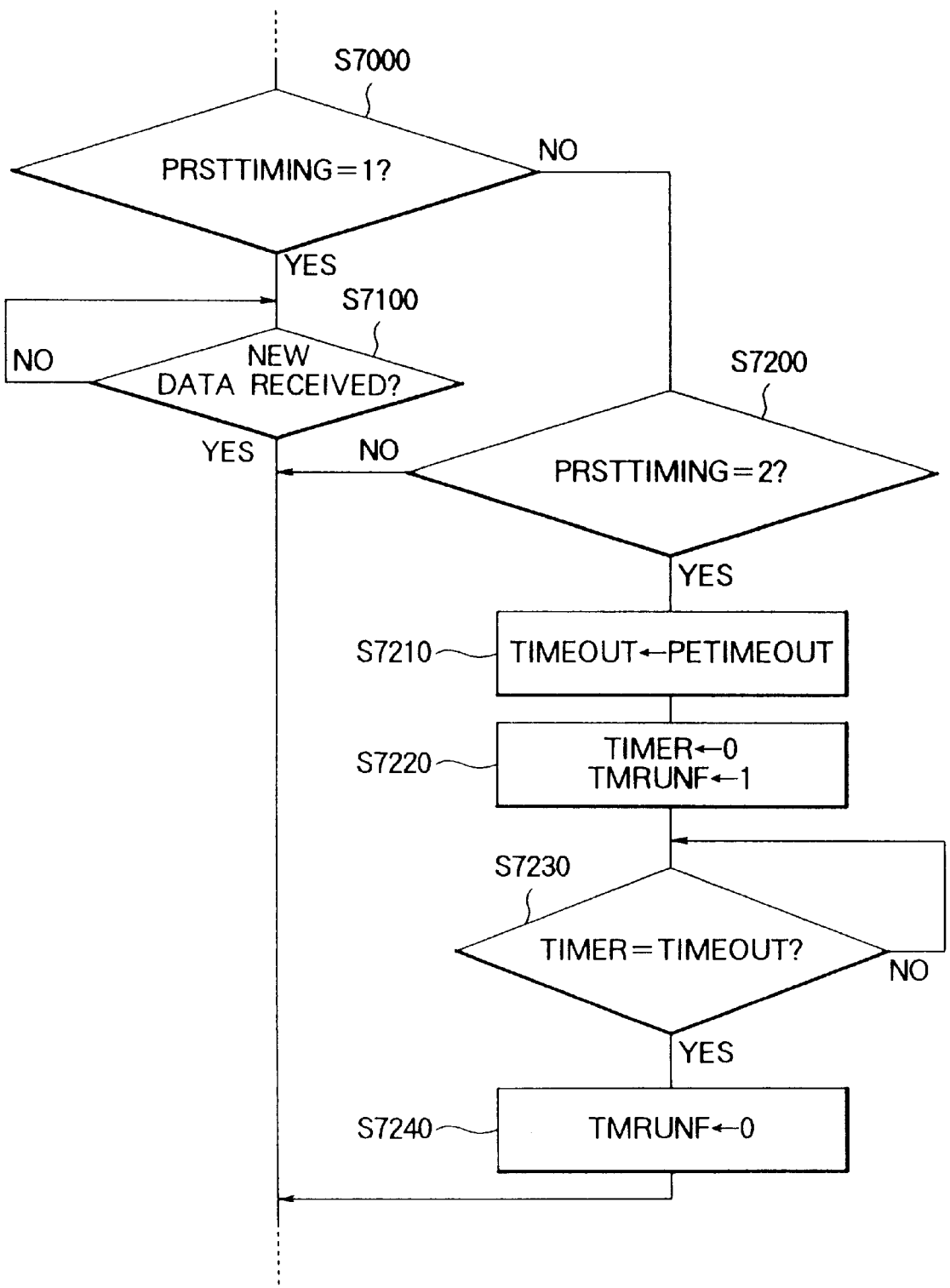
FIG. 11 is a flowchart partially illustrating the operation of the starting processor in the second embodiment.

FIG. 11 partially illustrates the operation of the starting processor 205 in the second embodiment. The illustrated steps are inserted between steps S710 and S730 in FIG. 8, replacing step S720. Steps S700, S710, and S730 to S770 are executed in the second embodiment as they were in the first embodiment.

Following step S710, in step S7000 in FIG. 11, the starting processor 205 compares the PRSTTIMING value with one. If PRSTTIMING is equal to one, then in step S7100 the starting processor 205 waits for new data to be received from the host computer 400 (step S7100), and proceeds to step S730 in FIG. 8 when at least one more byte is received, as in the first embodiment.

If PRSTTIMING is not equal to one, then in step S7200, the starting processor 205 compares PRSTTIMING with two. If PRSTTIMING is equal to two, then in step S7210, the starting processor 205 copies the waiting-time value from the PETIMEOUT location in the print buffer 206 to a time-out location (TIMEOUT) in an internal memory used by the starting processor 205. In the next step S7220, the starting processor 205 initializes the timer value (TIMER) of the hardware timer 208 to zero, and starts the hardware timer 208 by setting the timer-run flag (TMRUNF) to one. While running, the hardware timer 208 increments the timer value once per microsecond. In step S7230, the starting processor 205 waits for the timer value to reach the time-out value. When the two values are equal, the starting processor 205 halts the hardware timer 208 by clearing the timer-run flag to zero, and proceeds to step S730 in FIG. 8. Printing accordingly resumes after a delay equal to the waiting time designated in the page header.

If PRSTTIMING is not equal to either one or two, that is, if PRSTTIMING is equal to zero, then the starting processor 205 proceeds immediately from step S7200 to step S730 in FIG. 8, so that printing resumes as soon as the paper-end condition is cleared, as in the prior art.

In the second embodiment, the printer driver 420 can select the paper-end restart timing mode according to the operating characteristics of the host computer 400. For example, if the operating system 440 does not de-activate the port driver 450, the printer driver 420 can select the immediate restart mode to avoid unnecessary delays. If the sending of print data from the host computer 400 always resumes within a certain fixed time after the printer 1 becomes ready, the printer driver 420 can select the waiting-time mode and set a waiting time equal to or slightly less than this fixed time. The printer 1 can then resume printing before the host computer 400 resumes the sending of print data, without the risk that the arrival of new print data will be delayed so long as to force the printing of an incomplete page.

The second embodiment is one of numerous possible variations on the basic concept of the first embodiment. To mention just one further variation, the primary data processor 203 can be adapted to continue operating while the printer 1 is out of paper, and to determine whether the end of the data received so far from the host computer 400 coincides with the end of a page. If this is true, the printer 1 can be adapted to resume printing as soon as paper is resupplied and the paper-end sensor (PESENSOR) flag is cleared. This further variation deals with the possibility that the printer might run out of paper when the host computer 400 has already sent all remaining data to be printed and has no further data to send.

Next, a third embodiment will be described. The third embodiment is a printing system comprising an electrophotographic printer 1 of the type shown in FIG. 1 coupled to a host computer 400 of the type shown in FIG. 3. A particular feature of the third embodiment is that the printer driver 420 is adapted to send a warm-up command to the printer 1, and the printer 1 is adapted to execute this command by raising the temperature of the heating roller 107a to the temperature required for fusing.

The description of the third embodiment will focus on processing related to the warm-up command, omitting descriptions of features that have been described in the first and second embodiments. Resumption of printing after a paper-end condition may be handled as in either the first or second embodiment, or as in the prior art.

Figure 12:
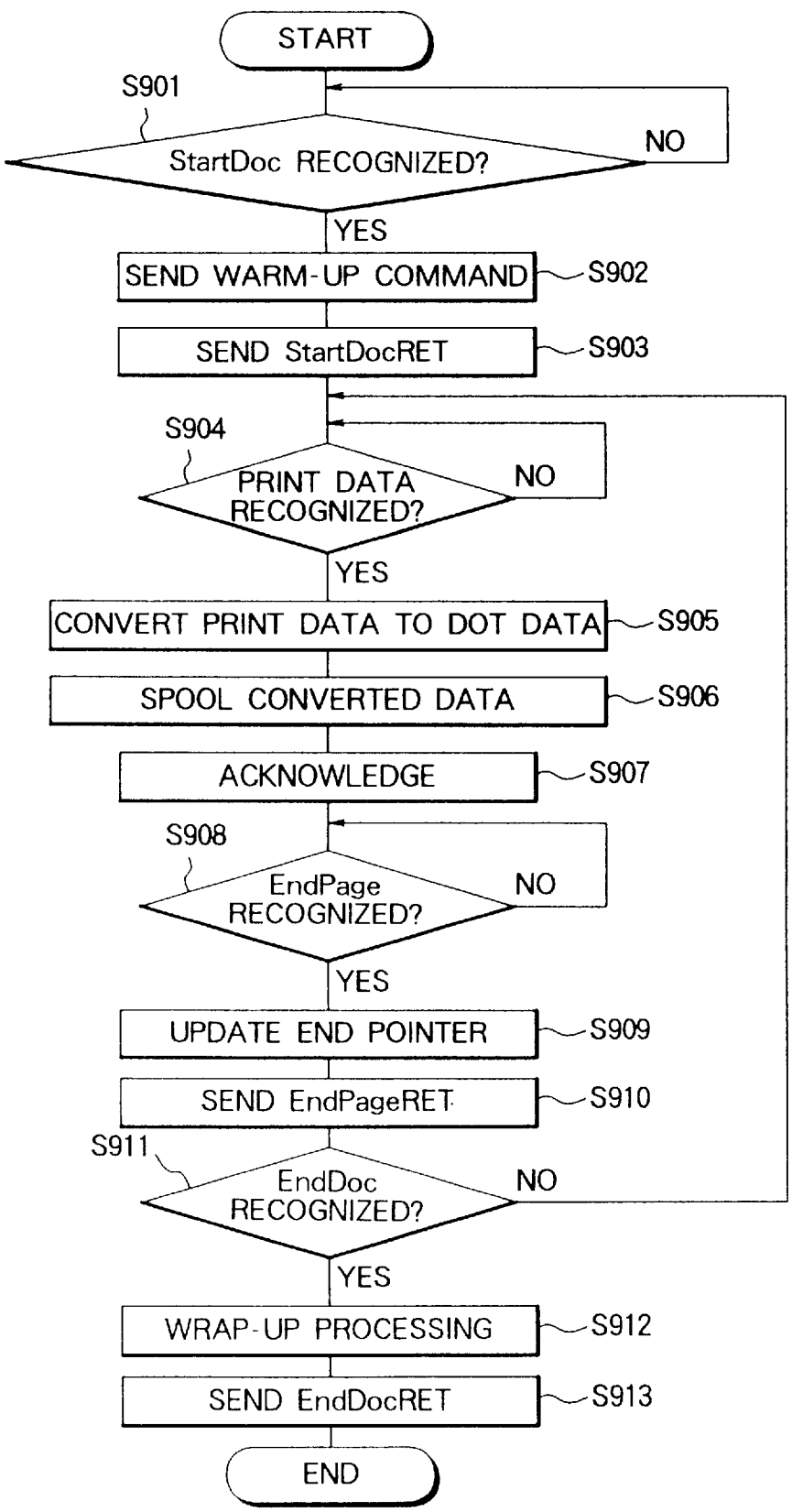
FIG. 12 is a flowchart illustrating the operation of the host computer in a third embodiment of the invention.

FIG. 12 illustrates the procedure followed by the host computer 400 in printing a document in the third embodiment. In step S901, the printer driver 420 waits to receive a StartDoc request from the computer's application software 410. The StartDoc request is issued by application software 410 in response to input from the computer's human operator. After receiving a StartDoc request, the printer driver 420 sends a warm-up command to the print spooler 430 in step S902, then sends the application software 410 a reply (StartDocRET) to the StartDoc request in step S903.

In step S904, the printer driver 420 waits for the application software 410 to pass one page of data to be printed. In step S905, the printer driver 420 converts the data to the format required by the printer 19 e.g. the format of FIGS. 3A, 3B, and 3C, comprising a page header and compressed raster lines of dot data. In step S906, the printer driver 420 passes the converted data to the print spooler 430, which stores the data in the file memory 460. In step S907, the printer driver 420 sends the application software 410 an acknowledgment indicating that the data have been received and processed.

After sending the data for one page, application software 410 sends an EndPage notification to the printer driver 420. The printer driver 420 waits to receive this notification in step S908, then has the print spooler 430 update an end pointer indicating the end of the data to be sent to the printer 1, in step S909. Next, in step S910, the printer driver 420 sends the application software 410 a reply (EndPageRET) to the EndPage notification.

In step S911, the printer driver 420 determines whether the current page is the last page, by determining whether an EndDoc notification has been received from the application software 410. The process from step S904 to step S910 is repeated until the EndDoc notification is received. When the EndDoc notification is received, the printer driver 420 performs a wrap-up process in step S912, then sends the application software 410 a reply (EndDocRET) to the EndDoc notification in step S913.

The print spooler 430 controls the sending of data to the printer 1 by means of a transmit pointer and the end pointer mentioned above, which point to locations in the file memory 460. When these pointers indicate the same location, there are no data to be sent, so the print spooler 430 takes no action. When these pointers indicate different locations, the print spooler 430 sends data to the printer 1 via the operating system 440 and port driver 450, starting from the location indicated by the transmit pointer, and updates the transmit pointer as the data are sent.

When the printer driver 420 issues the warm-up command in step S902, if the transmit pointer and end pointer currently point to the same location, the print spooler 430 writes the warm-up command in the file memory 460 at the location indicated by the pointers, and moves the end pointer to indicate the location just after the warm-up command. Since the transmit pointer and end pointer now indicate different locations, the print spooler 430 sends the warm-up command to the operating system 440 and port driver 450, for immediate transmission to the printer 1.

If the transmit pointer and end pointer point to different locations when the warm-up command is issued, the print spooler 430 writes the warm-up command on the file memory 460 at the location indicated by the end pointer, and updates the end pointer, but does not immediately send the warm-up command to the printer 1. This case occurs when one or more pages in other documents are already waiting to be printed. The warm-up command will be sent to the printer 1 after these pages have been printed, before printing of the next document commences.

The warm-up command is padded with data such as null codes so that the size of the warm-up command is equal to or greater than the page header size.

When the printer 1 receives a warm-up command, the warm-up command is stored in the receive buffer 202 by the host interface 201. Since the size of the warm-up command is equal to or greater than the page header size, the warm-up command is read promptly by the primary data processor 203. Upon reading a warm-up command, the primary data processor 203 sends a warm-up message to the starting processor 205, which notifies the supervisory unit 302. The supervisory unit 302 commands the fusing controller 308 to begin temperature control.

In the temperature control process, the fusing controller 308 compares the temperature reported by the temperature sensor 114 with the temperature necessary for fusing, and feeds additional current to the heating element in the heating roller 107a if the temperature reported by the temperature sensor 114 is below the necessary temperature. This form of control continues until the temperature reported by the temperature sensor 114 reaches the necessary temperature, whereupon the fusing controller 308 notifies the supervisory unit 302 that the fusing unit 107 is ready for action. The supervisory unit 302 in turn notifies the starting processor 205 that the printing engine 100 is ready to print. The fusing controller 308 continues to control the feeding of current so as to hold the temperature of the heating roller 107a at the necessary temperature.

After reading the warm-up command, the primary data processor 203 reads the page header of the first page of the document to be printed, followed by the dot data, and sets the print-start request flag (PRSTRQF) as described earlier. Before sending hopping and printing commands to the printing engine controller 300, the starting processor 205 checks whether the printing engine 100 is ready to print (this check was omitted from the flowchart in FIG. 8, but is performed before step S740). If the printing engine 100 is not ready to print, the starting processor 205 delays the hopping and printing commands until the printing engine 100 becomes ready.

Figure 13:
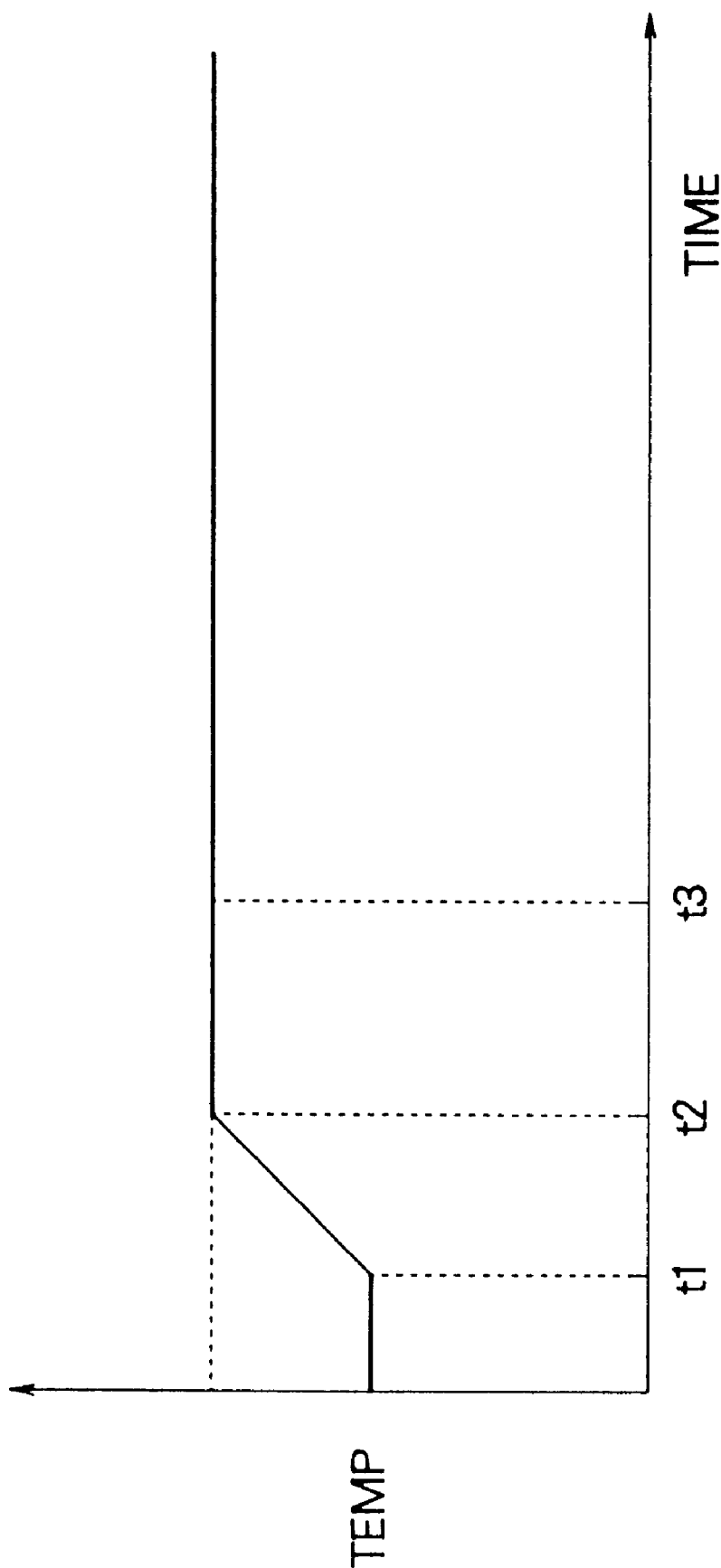
FIG. 13 is a graph illustrating temperature control in the fusing unit in the third embodiment.

FIG. 13 illustrates the timing of these operations for a case in which the heating roller 107a reaches the necessary temperature before the page header of the first page is received from the host computer 400. The horizontal axis in FIG. 13 represents time; the vertical axis represents the temperature of the heating roller 107a. Initially, the printer 1 is idle, and the fusing unit 107 is at a comparatively low temperature. At time t1, a warm-up command is received, and the fusing controller 308 energizes the heating element in the heating roller 107a to raise the temperature. At time t2, the heating roller 107a reaches the necessary fusing temperature. Thereafter, the fusing controller 308 continues to hold the heating roller 107a at this temperature. At time t3 the page header of the first page of the document is received, and printing begins.

In this case, from the time when the computer's human operator gives a printing command, the only delay before printing actually starts is the time taken by the host computer 400 to prepare the first page of print data and send the first page header to the printer 1. When the page header is received, printing can start immediately, because the heating roller 107a is already at the necessary temperature.

If the first page header were to be received before the heating roller 107a reached the necessary temperature, i.e. if point t3 were to the left of point t2, then the delay would be equal to the time from t1 to t2, but this delay is still shorter than in the prior art, where the delay from t1 to t2 is added to the delay from t1 to t3.

When two documents are printed in succession, the warm-up command for the second document will be received while the heating roller 107a is already at the necessary fusing temperature. In this case, the warm-up command informs the printer 1 not to reduce the temperature of the heating roller 107a, even if there is a delay before the first page of the second document is received.

Next, a fourth embodiment will be described. The fourth embodiment adds to the third embodiment a command specifying the fusing temperature, so that the fusing temperature can be adjusted by the human operator of the host computer 400.

FIG. 14 shows an example of the format of this command. The first three bytes, comprising two hexadecimal digits (1C and 14) and the letter 't,' indicate that the command is a fusing temperature command. The next byte is a code specifying the fusing temperature. The last byte indicates the end of the command. Temperatures from 100° C. to 130° C. can be specified, in increments of 10° C., by code values from zero to three.

Figures 15, 16:
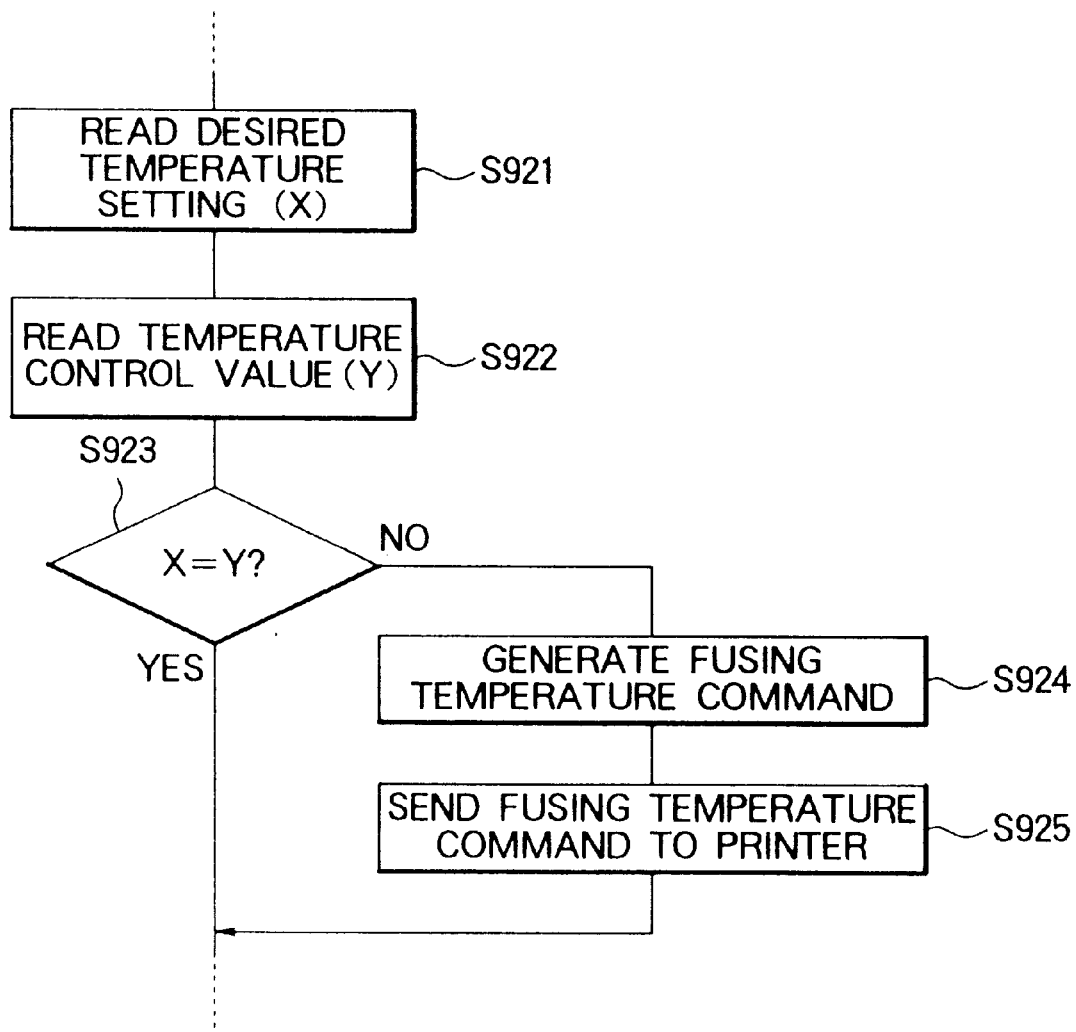
FIG. 15 is a flowchart partially illustrating the operation of the printer driver in the fourth embodiment.
FIG. 16 illustrates a table of fusing temperatures stored in the printer in the fourth embodiment.

The fusing temperature command is generated in the host computer 400 by the procedure illustrated in FIG. 15. These steps are executed between steps S901 and S902 in FIG. 12, just before the warm-up command is generated. In step S921, the printer driver 420 reads the desired fusing temperature (X), which is selected by the human operator and set in a table of parameter data used by the printer driver 420. In step S922, the printer driver 420 reads the current control value setting of the fusing temperature (Y), which is also set in the table of parameter data. In step S923, the printer driver 420 compares the two values (X and Y), and proceeds directly to step S902 if the two values are equal.

If the two values (X and Y) are not equal, the printer driver 420 encodes the desired fusing temperature in a fusing temperature command in step S924, has the print spooler 430, operating system 440, and port driver 450 send this command to the printer 1 in step S925, then proceeds to send the warm-up command in step S902, and continues as in the third embodiment. Accordingly, when the human operator adjusts the desired fusing temperature, the host computer 400 sends the new temperature to the printer 1 just before the warm-up command at the beginning of the next document to be printed.

Incidentally, it is possible to omit steps S922 and S923 and send a fusing temperature command to the printer 1 before every warm-up command, regardless of whether the human operator has changed the desired fusing temperature or not.

Referring to FIG. 16, the printer 1 has a table of temperatures corresponding to the parameter values of the fusing temperature command. The table is stored in, for example, a nonvolatile memory, and is accessed by a relative addressing scheme whereby TEMP-CMD[X] corresponds to the parameter value X in the fusing temperature command.

Figure 17:
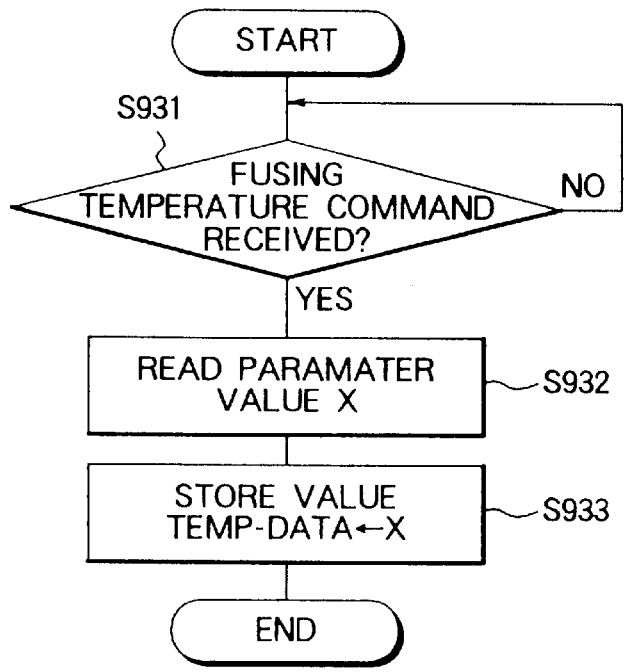
FIG. 17 is a flowchart partially illustrating the operation of the primary data processor in the fourth embodiment.

FIG. 17 shows the operation of the part of the primary data processor 203 that processes the fusing temperature command. This part of the primary data processor 203 remains inactive until a fusing temperature command is received (step S931). When a fusing temperature command is received, the parameter value (X) is read in step S932, and written in a work area in, for example, a non-volatile memory, as the value of a variable TEMP-DATA, in step S933. Thereafter, when the starting processor 205 notifies the supervisory unit 302 of a warm-up command, and the supervisory unit 302 activates the fusing controller 308, the fusing controller 308 reads the TEMP-DATA value from the work area.

Figure 18:
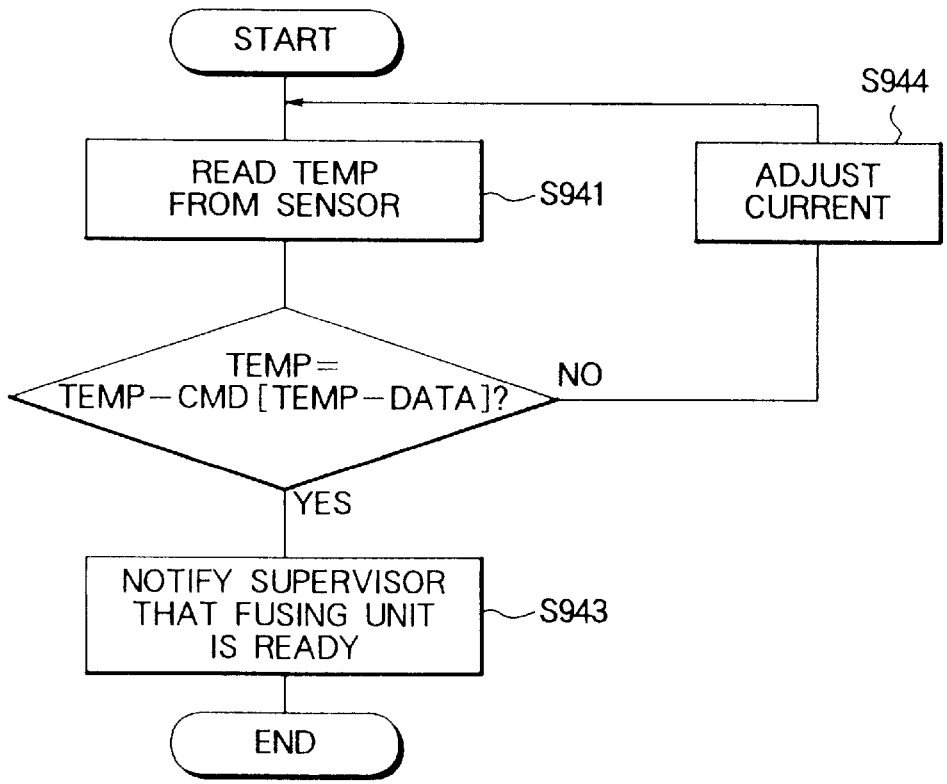
FIG. 18 is a flowchart illustrating the operation of the fusing controller in the fourth embodiment.

FIG. 18 illustrates the temperature control process performed by the fusing controller 308. In step S941, the fusing controller 308 reads the temperature sensor 114 to obtain the temperature (TEMP) of the heating roller 107a. In step S942, the fusing controller 308 compares this temperature with the value TEMP-CMD[TEMP-DATA] read from the above-mentioned table. If the two values are equal, in step S943, the fusing controller 308 notifies the supervisory unit 302 that temperature control has been completed. If the two values are not equal, the fusing controller 308 adjusts the current fed to the heating element in the heating roller 107a in step S944, then returns to step S941 to continue temperature control.

Figure 19:
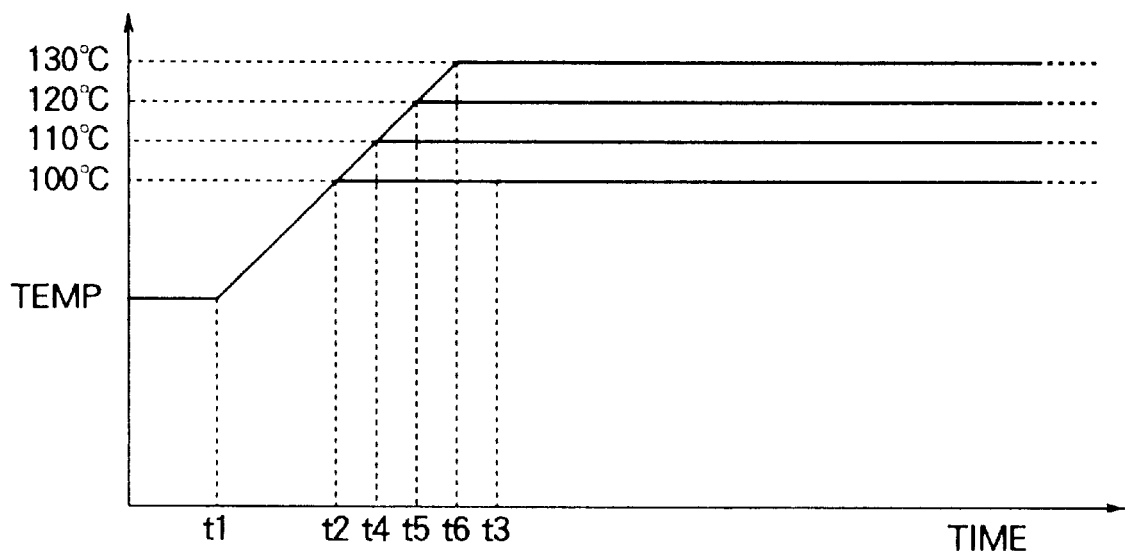
FIG. 19 is a graph illustrating temperature control in the fusing unit in the fourth embodiment.

FIG. 19 shows an example of the operation of the fourth embodiment. The horizontal and vertical axes have the same meaning as in FIG. 13. The warm-up command is received at time t1. If the fusing temperature has been set to 100° C. by a fusing temperature command, temperature control ends at time t2, and printing commences when the page header of the first page is received at time t3. If the fusing temperature has been set to 110° C., 120° C., or 130° C. by a fusing temperature command, temperature control ends at time t4, t5, or t6, still in time to begin printing of the first page at time t3.

As FIG. 19 shows, the warm-up time depends on the selected fusing temperature, so the human operator can shorten the warm-up time and conserve energy by selecting the lowest fusing temperature that produces adequate fusing of the toner particles to the paper. In addition, the fusing temperature affects the quality of the printed pages in various ways, e.g. by producing different amounts of curl in different types of paper. By allowing the human operator to adjust the fusing temperature, the fourth embodiment not only enables the warm-up time to be shortened, but also enables various temperature-related printing quality problems to be solved.

Several embodiments and variations of the invention have been described above, but those skilled in the art will recognize that further variations are possible within the scope claimed below.

What is claimed is:

1. A method of controlling the resumption of printing when a printer runs out of printing media during the printing of a series of pages, the data printed on said pages being sent to the printer from a host computer and stored in a buffer in the printer, comprising the steps of:

setting a flag in said printer, and signaling said host computer to stop sending data to said printer, when said printer runs out of said printing media;

signaling said host computer to resume sending data to said printer, when said printer is resupplied with said printing media;

clearing said flag after said host computer resumes sending said data to said printer; and resuming the printing of said series of pages after said flag has been cleared.

2. The method of claim 1, wherein the data sent from said host computer to said printer comprise dot data describing raster lines of dots on said pages.

3. The method of claim 1, wherein said printer is an electrophotographic printer.

4. The method of claim 1, further comprising the steps of:

selecting a paper-end restart timing mode from at least a first mode and a second mode;

resuming the printing of said series of pages after said flag has been cleared, as described in said claim 1, if said first mode is selected; and resuming the printing of said series of pages as soon as said printer is resupplied with said printing media, without waiting for said flag to be cleared, if said second mode is selected.

5. The method of claim 4, wherein a third mode is provided for selection as said paper-end restart timing mode, further comprising the steps of:

waiting for a certain interval of time from when said printer is resupplied with said printing media, if said third mode is selected; and resuming the printing of said series of pages when said interval of time expires, if said third mode is selected.

6. The method of claim 4, wherein said step of selecting a paper-end restart timing mode comprises sending a value designating said paper-end restart timing mode from said host computer to said printer.

7. A printer having a buffer for storing data received from a host computer, having a printing engine for printing the stored data on printing media as a series of pages, having a sensor for sensing presence and absence of said printing media, having an interface for sending signals requesting that the host computer stop sending data when the printer runs out of printing media and resume sending data when the printer is resupplied with printing media, and comprising:

a switch and sensor processor for setting a flag when said printer runs out of said printing media; and a starting processor coupled to said switch and sensor processor, for checking said flag, clearing said flag, if set, when said host computer sends data to said printer, and generating a print command that causes said printing engine to start printing the data in said buffer on a page of said printing media when initial data for said page have been stored in said buffer, provided said flag is cleared.

8. The printer of claim 7, wherein the data sent from said host computer to said printer comprise dot data describing raster lines of dots.

9. The printer of claim 7, wherein said printer is an electrophotographic printer.

10. The printer of claim 7, wherein:

said buffer stores a code designating a paper-end restart timing mode selected from at least a first mode and a second mode;

if said code designates said first mode, and if said flag is set, said starting processor clears said flag and generates said print command only after said host computer sends more data to said printer, as described in said claim 7; and if said code designates said second mode, and if said flag is set, said starting processor clears said flag and generates said print command as soon as said printer has been resupplied with printing media, without waiting for said host computer to send more data.

11. The printer of claim 10, wherein:

a third mode is provided for selection as said paper-end restart timing mode; and if said code designates said third mode, and if said flag is set, said starting processor waits for a certain interval of time, then clears said flag and generates said print command, regardless of whether said host computer sends more data.

12. The printer of claim 10, also comprising a primary data processor for setting said code in response to information received from said host computer.

13. A method of having a printer including a heating element print data generated in a host computer, starting from a state in which the printer is idle and the heating element is at a temperature below a temperature necessary for printing, comprising the steps of:

sending a warm-up command from said host computer to said printer, thereby causing said printer to bring said heating element to the necessary temperature;

generating said data in said host computer after sending said warm-up command;

sending said data from said host computer to said printer;

printing said data in said printer; and allowing the temperature of the heating element to fall below said necessary temperature a predetermined time after completion of the printing of said data.

14. The method of claim 13, wherein the data sent from said host computer to said printer comprise dot data describing raster lines of dots.

15. The method of claim 13, wherein said printer is an electrophotographic printer.

16. The method of claim 15, wherein said printer has a fusing unit which includes the heating element.

17. The method of claim 16, wherein said necessary temperature is selectable.

18. The method of claim 17, further comprising a step of sending a temperature command selecting said necessary temperature, from said host computer to said printer, before said step of sending a warm-up command.

19. The method of claim 18, wherein said temperature command is generated in response to input from a human operator of said host computer.

20. The method of claim 13, wherein said host computer executes a driver program and an application program, and said driver program sends said warm-up command to said printer when said driver program receives a printing command from said application program.

21. A printing system having a host computer for generating data to be printed and a printer for printing said data, wherein:

said host computer has a first program for generating source data, and a second program for receiving said source data, sending a warm-up command to said printer, then generating the data to be printed from said source data and sending said data to be printed to said printer; and said printer has a primary data processor for executing said warm-up command, thereby causing said printer to begin preparations for printing before said printer receives said data to be printed.

22. The printing system of claim 21, wherein the data sent from said host computer to said printer comprise dot data describing raster lines of dots.

23. The printing system of claim 21, wherein said printer is an electrophotographic printer.

24. The printing system of claim 23, wherein said printer has a fusing unit with a heating roller, and said preparations for printing comprise heating said heating roller to a certain temperature.

25. The printing system of claim 24, wherein said temperature is selectable.

26. The printing system of claim 25 wherein, before sending said warm-up command, said second program sends said printer a temperature command selecting said temperature.

27. The printing system of claim 26, wherein said temperature command is generated in response to input from a human operator of said host computer.

* * * * *